(12) United States Patent
Stahl

(10) Patent No.: US 10,549,799 B1
(45) Date of Patent: Feb. 4, 2020

(54) DISPLAY SYSTEM FOR RECREATIONAL VEHICLE TRAILERS

(71) Applicant: Triple S Machining LLC, Danville, PA (US)

(72) Inventor: Chad Stahl, Danville, PA (US)

(73) Assignee: Triple S Machining LLC, Danville, PA (US)

( * ) Notice: Subject to any disclaimer, the term of this patent is extended or adjusted under 35 U.S.C. 154(b) by 0 days.

(21) Appl. No.: 16/122,223

(22) Filed: Sep. 5, 2018

(51) Int. Cl.
*B62D 65/16* (2006.01)
*B62D 53/08* (2006.01)
*G09F 17/00* (2006.01)

(52) U.S. Cl.
CPC ......... *B62D 65/16* (2013.01); *B62D 53/0842* (2013.01); *G09F 17/00* (2013.01); *G09F 2017/0075* (2013.01)

(58) Field of Classification Search
CPC ..... B62D 65/16; B62D 53/0842; G09F 17/00; G09F 2017/0075
See application file for complete search history.

(56) References Cited

U.S. PATENT DOCUMENTS

| | | | | |
|---|---|---|---|---|
| 1,103,257 A | * | 7/1914 | Bollinger, Jr. ......... | A01K 97/10 248/512 |
| 1,551,719 A | * | 9/1925 | Williams ................. | E04H 12/32 248/230.5 |
| 4,570,887 A | * | 2/1986 | Banister ............... | F16M 11/041 248/187.1 |
| 4,593,877 A | * | 6/1986 | van der Wyk .......... | E04H 12/32 248/230.8 |
| 4,865,287 A | * | 9/1989 | Stoudt ..................... | E04H 12/32 248/513 |
| 4,986,209 A | * | 1/1991 | Spica ..................... | B60Q 1/268 116/173 |
| 5,156,110 A | * | 10/1992 | Fuller ..................... | G09F 17/00 116/173 |
| 5,205,446 A | * | 4/1993 | Greenberg ................ | B60R 9/02 224/497 |
| 5,815,976 A | * | 10/1998 | Jernigan ................. | A01K 97/10 43/21.2 |
| 6,138,978 A | * | 10/2000 | Andersen ............ | E04H 12/2261 116/173 |
| 6,402,116 B1 | | 6/2002 | Northup | |
| 7,293,523 B1 | * | 11/2007 | Lentz ..................... | G09F 17/00 116/173 |
| D584,363 S | * | 1/2009 | Gordon ........................ | D12/400 |
| D632,231 S | * | 2/2011 | Mattucci ..................... | D12/162 |
| D712,315 S | * | 9/2014 | Wagner ........................ | D12/162 |
| 2004/0169121 A1 | * | 9/2004 | Winn ...................... | A45B 1/00 248/530 |

(Continued)

*Primary Examiner* — Erez Gurari
(74) *Attorney, Agent, or Firm* — Barley Snyder

(57) ABSTRACT

A display system for a recreational vehicle connector is provided and includes a retention section, a display section and a plurality of display poles. The retention section includes a retention body, a flange receiving opening extending through the retention body and into a flange receiving section, and a shank receiving passageway positioned above and extending transverse into the flange receiving section. The display section includes a display body connected to the retention system and a plurality of pole receiving passageways extending there though. The plurality of display poles are positioned in the plurality of pole receiving passageways.

25 Claims, 8 Drawing Sheets

(56) References Cited

U.S. PATENT DOCUMENTS

| | | | | |
|---|---|---|---|---|
| 2005/0108909 | A1* | 5/2005 | Andersen | G09F 21/04 40/591 |
| 2006/0053667 | A1* | 3/2006 | Andersen | G09F 21/04 40/591 |
| 2006/0156600 | A1* | 7/2006 | Barker | G09F 17/00 40/591 |
| 2006/0218835 | A1* | 10/2006 | Chafin | G09F 21/04 40/611.05 |
| 2011/0187079 | A1* | 8/2011 | Desmarais | B60D 1/60 280/432 |
| 2011/0290171 | A1* | 12/2011 | Brick | E04H 12/2238 116/173 |
| 2014/0054427 | A1* | 2/2014 | Garceau | B60D 1/66 248/157 |
| 2014/0339790 | A1* | 11/2014 | Terpsma | B60D 1/015 280/433 |
| 2015/0274086 | A1* | 10/2015 | Moak | G09F 21/04 296/37.6 |
| 2016/0035257 | A1* | 2/2016 | Likas | G09F 17/00 40/591 |
| 2016/0063904 | A1* | 3/2016 | Heath | G09F 17/00 362/545 |
| 2017/0046989 | A1* | 2/2017 | Butler, III | G09F 17/00 |
| 2017/0132959 | A1* | 5/2017 | Cornelius | G09F 17/00 |

* cited by examiner

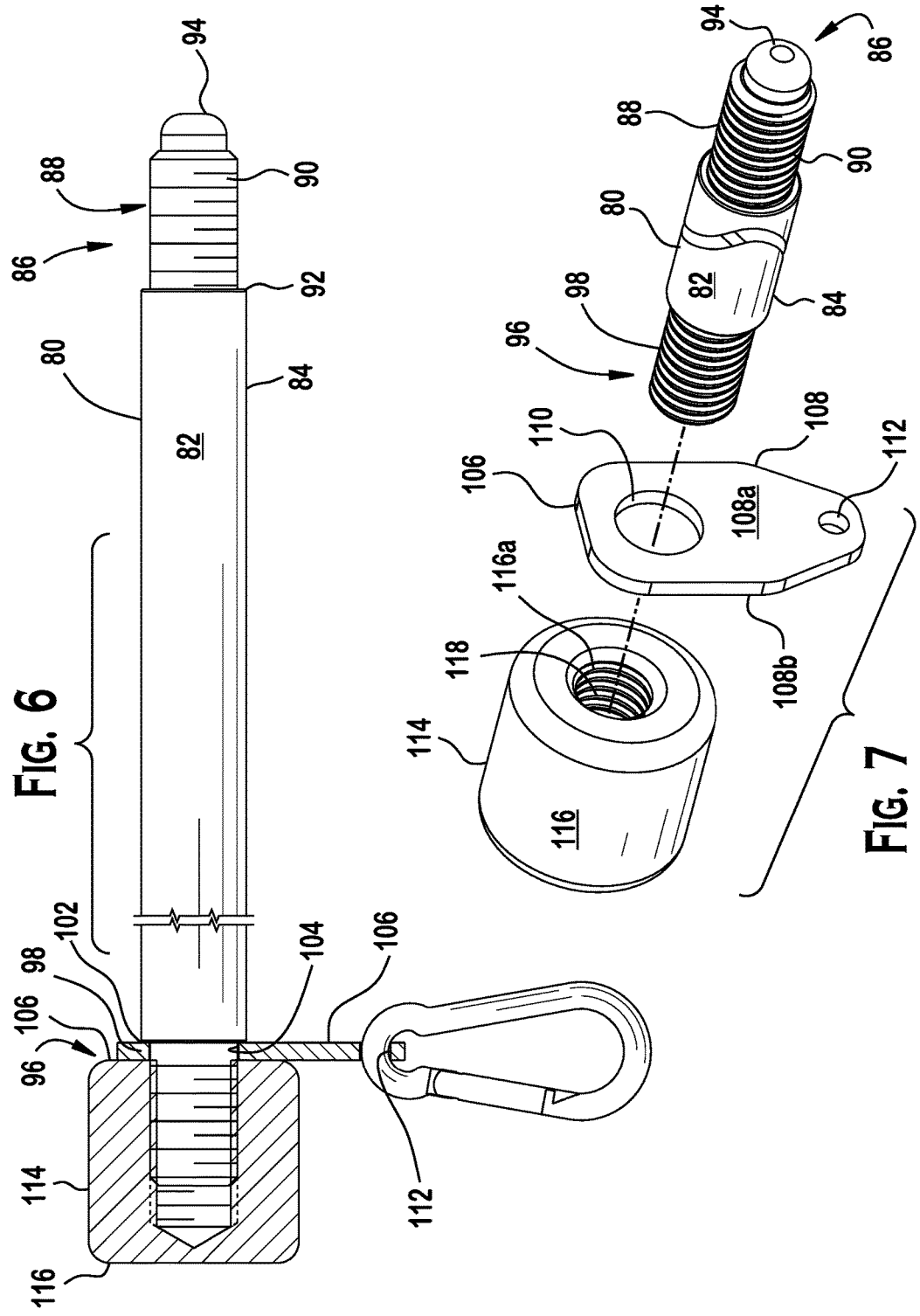

DISPLAY SYSTEM FOR RECREATIONAL VEHICLE TRAILERS

FIELD OF THE INVENTION

The invention relates to a display system and, more particularly, to a display system for recreational vehicle trailers.

BACKGROUND OF THE INVENTION

Recreation vehicles (or "RV's") trailers are commonly hitched to motor vehicles using known connection devices, such as a fifth wheel, goose neck, or hitch style connection assemblies.

As shown in FIG. 1, an exemplary recreational vehicle trailer 200 includes connection assembly such as a fifth wheel connector assembly 202. Generally, the fifth wheel connector assembly includes a bearing plate 204 secured to the recreational vehicle trailer 200 and a kingpin 206 extending downward therefrom the bearing plate 204. The kingpin 206 includes a collar 208, a shank 210, and a lower flange 212. The collar 208 is secured to the bearing plate 204 and the shank 210 extends downward from the collar 208. The lower flange 212 is seated at the bottom of the shank 210 and separated from the collar 208 by a length of the shank 210.

When parked, the recreational vehicle trailer 200 is typically positioned such that a front end is displayed. The kingpin 206 (or other connector) is usually visible and generally considered unsightly. There is a need to cover up this area when not in use, so that the parked recreational vehicle trailer is aesthetically pleasing.

Further, many recreational vehicle trailers have common designs, so there is a need to distinguish parked recreational vehicle trailers from adjacent and other proximate parked recreational vehicle trailers.

SUMMARY

In view of the foregoing, a display system for a recreational vehicle connector is provided. The display system includes a retention section, a display section and a plurality of display poles. The retention section includes a retention body, a flange receiving opening extending through the retention body and into a flange receiving section, and a shank receiving passageway positioned above and extending transverse into the flange receiving section. The display section includes a display body connected to the retention system and a plurality of pole receiving passageways extending there though. The plurality of display poles are positioned in the plurality of pole receiving passageways.

BRIEF DESCRIPTION OF THE DRAWINGS

The invention is explained in greater detail below with reference to embodiments and to the appended drawings of which:

FIG. 6 is a side view of a display pole for the display system according to the invention;

FIG. 7 is an exploded view of the display pole of FIG. 6;

DETAILED DESCRIPTION OF THE EMBODIMENT(S)

Figure 1:
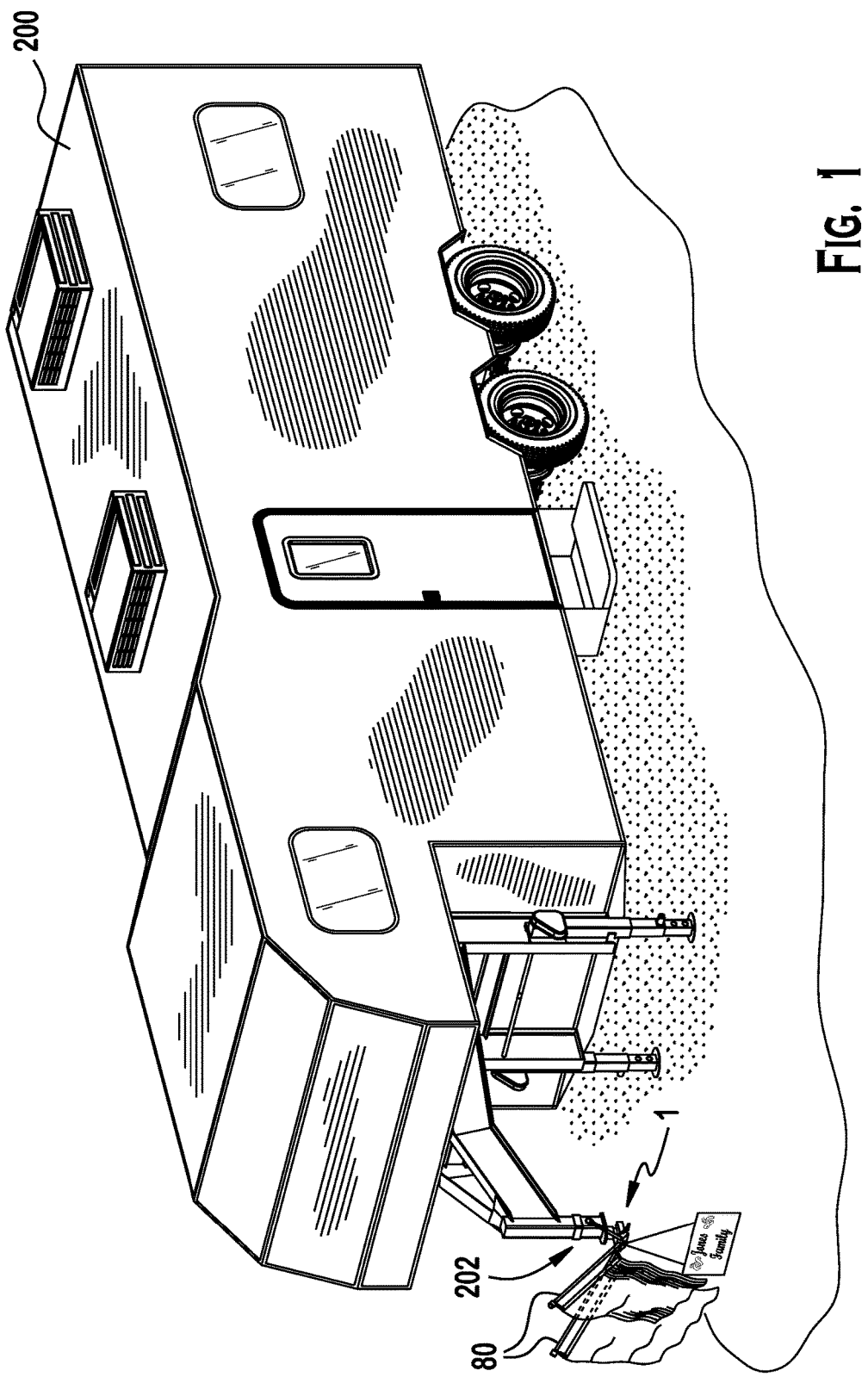
FIG. 1 is a perspective view of a display system according to the invention, shown connected to a known recreational vehicle trailer having a fifth wheel connector.

With respect to FIGS. 1-14, a display system 1 according to the invention is shown. For sake of brevity, this description will detail exemplary embodiment that connects to a known fifth wheel connector assembly 202 of a known recreational vehicle trailer 200. However, one skilled in the art should appreciate a display system 1 according to the invention could connect and be used with various known connection assemblies, including goose neck and hitch style connectors.

Generally, a display system 1 according to the invention includes a retention section 10, a display section 40, and a plurality of display poles 80.

Figure 2:
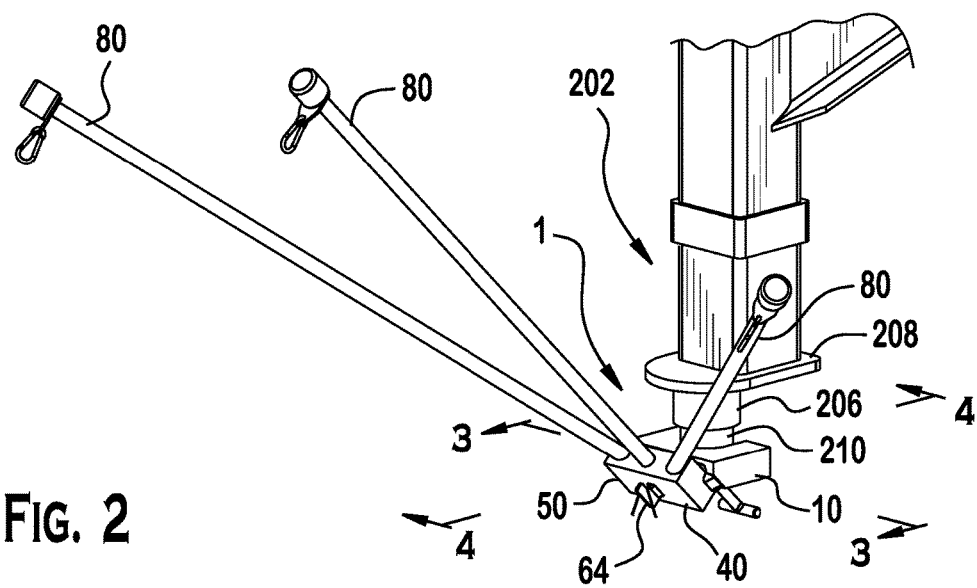
FIG. 2 is a close up perspective view of the display system in FIG. 1.
Figure 3:
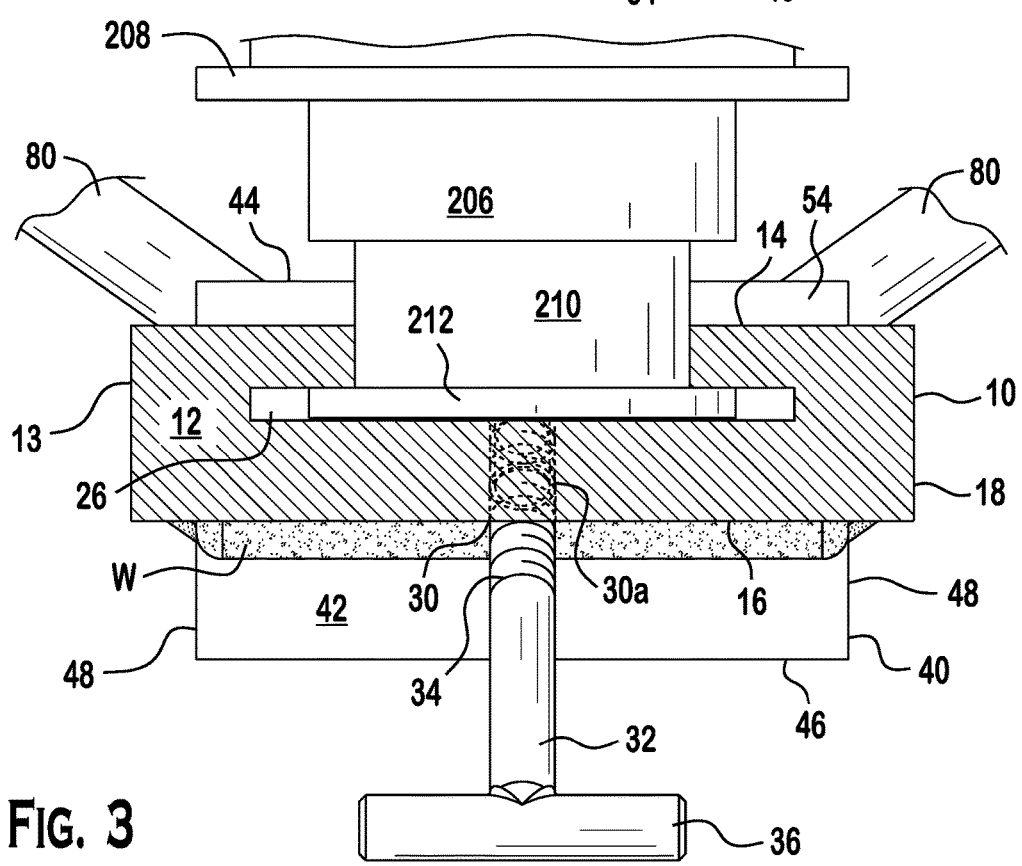
FIG. 3 is a sectional view of the display system in FIG. 2 taken along line 3-3.
Figure 4:
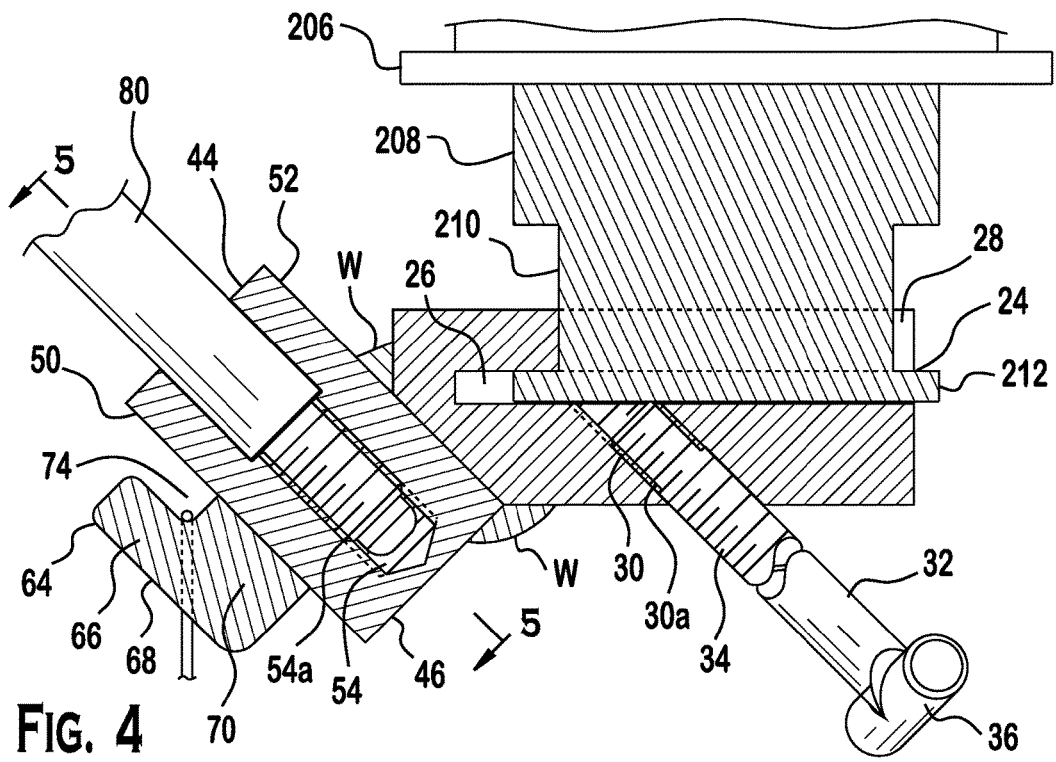
FIG. 4 is another sectional view of the display system in FIG. 2 taken along line 4-4.

With reference to FIGS. 2-4, an exemplary embodiment of the retention section 10 will be described. For the embodiment of the present invention illustrated and being described, the retention section 10 generally includes a retention body 12, a flange receiving opening 24, a flange receiving section 26, a connector receiving passageway 28, and a retention device receiving passageway 30.

As shown, the retention body 12 is a monolithic structure prepared from a solid piece of metal. In an exemplary embodiment, the retention body 12 is generally rectangular shaped. However, one skilled in the art should appreciate that the other shapes are possible, including square and cylindrical shape solids. Further, the retention body 12 is made from aluminum, however, one skilled in the art should appreciate that the body could be made from other rigid materials, including other metals and rigid polymers or composites.

In an exemplary embodiment of the invention, the retention body 12 includes a top wall 14 spaced from a bottom wall 16, with body sidewalls 18 extending between the top wall 14 and the bottom wall 16. The retention body 12, as shown, further includes a front wall 20 and a rear wall 22 positioned opposite the front wall 20. Additionally, the retention body 12 includes a connection wall 23 extending between the rear wall 22 and the bottom wall 16. In the least, the connection wall 23 includes planar surface to bias and connect to the display section 40. In some embodiment, the retention section 10 and the display section 40 will be integral pieces of a monolithic structure. As shown, it is angled with respect to the rear wall 22 such that connection provided the display section 40 at an angle.

A flange receiving opening 24 is a slot positioned along the front wall 20. The flange receiving opening is positioned between the top wall 14 and the bottom wall 16. The flange receiving opening 24 is shaped and size to correspond to a lower flange 212 of a known kingpin 206. As shown, the flange receiving opening 24 has a width and height larger than a width and height of the lower flange 212.

A flange receiving section 26 is a slot extending from flange receiving opening 24, through the retention body 12 and toward the rear wall 22. As shown, the flange receiving section 26 is box shaped slot having inner sidewalls 26a that are formed by inner surfaces of the top wall 14, the bottom wall 16, the side walls 18, front wall 20 and the rear wall 22. The flange receiving section 26 has a width and height matching with the flange receiving opening 24. Further, in the shown embodiment, the flange receiving section 26 has a length larger than the width the lower flange 212.

A connector receiving passageway 28 is an elongated opening extending along the top wall 14. The connector receiving passageway 28 extends backward from the front wall 20 to the rear wall 22 and downward from the top wall 14 to the flange receiving section 26. The connector receiving passageway 28 corresponds with the flange receiving opening 24 along the flange receiving section 26. In the shown embodiment, the flange receiving section 26 is a u-shaped channel having inner sidewalls 30a extending between the top wall 14 to the about the flange receiving section 26.

As shown in FIG. 4, the retention body 12 further includes a retention device receiving passageway 30 extending through the bottom wall 16 to the flange receiving section 26. In the shown embodiment, the connector receiving passageway 28 is a cylindrical channel that is angled with respect to the bottom wall 16 and the flange receiving section 26. The retention device receiving passageway 30 includes inner sidewalls 30a that are threaded in the embodiment shown.

As shown in FIG. 4, a retention device 32 is provided and includes a threaded shaft section 34 and a handle 36. The threaded shaft section 34 corresponds with the retention device receiving passageway 30, such that the threaded shaft section 34 is received by the retention device receiving passageway 30 and proceeds into flange receiving section 26 as the threaded shaft section 34 is advanced by threads when twisting of the handle 36.

With reference to FIGS. 2-5, an exemplary embodiment of the display section 40 will be described. For the embodiment of the present invention illustrated and being described, the display section 40 generally includes a display body 42, plurality of pole receiving passageways 54, and a display extender 64.

As shown, the display body 42 is a monolithic structure prepared from a solid piece of metal. In an exemplary embodiment, the display body 42 is generally rectangular shaped. However, one skilled in the art should appreciate that the other shapes are possible, including square and cylindrical shape solids. Further, the display body 42 is made from aluminum, however, one skilled in the art should appreciate that the body could be made from other rigid materials, including other metals and rigid polymers or composites.

In an exemplary embodiment of the invention, the display body 42 includes a top wall 44 spaced from a bottom wall 46, with side walls 48 extending between the top wall 44 and the bottom wall 46. The display body 42, as shown, further includes a front wall 50 and a rear wall 52 positioned opposite the front wall 50. As shown in FIG. 4, the display section 40 is connected to the retention section 10 using a mechanical connection, such a weld (W). While the retention section 10 and the display section 40 are show as separate bodies, one skilled in the art should appreciate that the retention section 10 and the display section 40 could be prepared from a single monolithic body without the need of a weld to connect the two sections.

Figure 5:
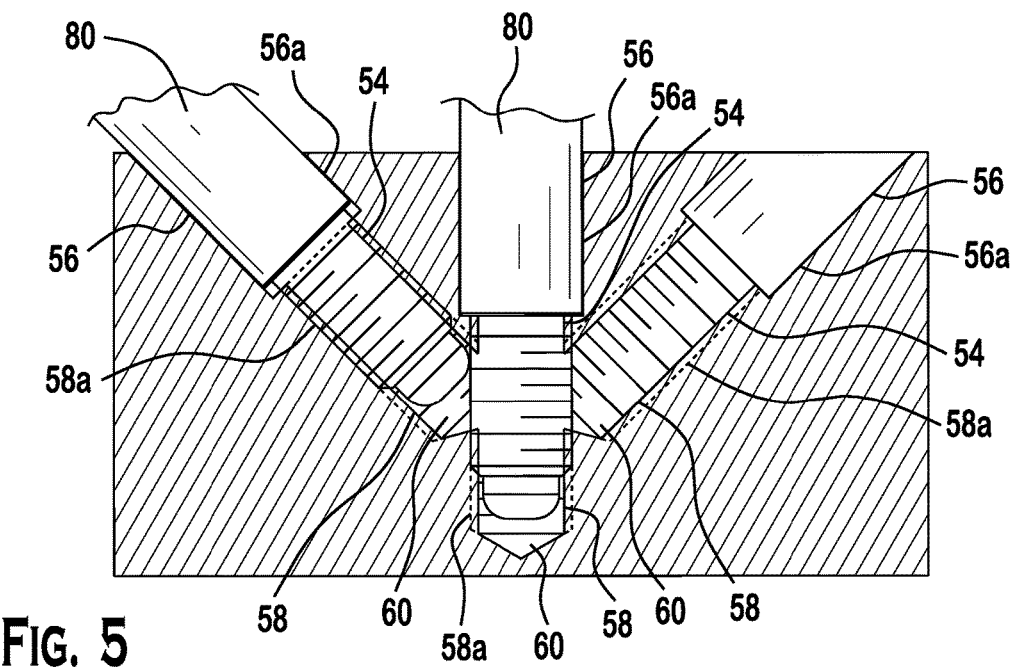
FIG. 5 is another sectional view of the display system in FIG. 4 taken along line 5-5.

With reference to FIGS. 4 and 5, the plurality of pole receiving passageways 54 are shown. Each pole receiving passageway 54 is a cylindrical channel extending from the top wall 44 to the bottom wall 46 and includes inner sidewalls 54a. In the embodiment shown, the pole receiving passageways 54 are positioned such that one pole receiving passageway 54 is aligned with a vertical axis of the display body 42 and a pair of pole receiving passageways 54 that are angled with respect to the vertical axis of the display body 42.

Each pole receiving passageway 54 generally includes a pole receiving section 56, a pole retention section 58 and a head receiving section 60. The pole receiving section 56 is cylindrical and includes smooth is formed from smooth inner sidewalls 56a extending from a top surface of the top wall toward a center of the display body 42 and a pole receiving flange 56b positioned at an end thereof. The pole retention section 58 is also cylindrical and provided by threaded inner walls 58a that extends from the pole receiving flange 56b toward the center of the display section 40. In the shown embodiment, the pole retention section 58 has a diameter that is smaller than the pole receiving section 56. The head receiving section 60 is a space positioned between the pole retention section 58 and the display body 42. In the shown embodiment, the head receiving section 60 is a conical shaped space formed from smooth inner sidewalls 60a.

As shown in FIG. 4, the display section 40 further includes a display extender 64 positioned along the front wall 50 of the display body 42. The display extended generally includes a catch 66 and a signage receiving section 74 former between the catch 66 and the display body 42. The catch 66 is a hook like member having a support section 68 and an extension 70 orthogonally positioned to the support section 68 and connected to the display body 42.

Now with reference to FIGS. 6 and 7, a display pole 80 according to the invention will be described. As shown, the display pole 80 generally includes a shaft 82, a display rotation member 106, and a pole head 114.

For the embodiment of the present invention illustrated and being described, the shaft 82 is an elongated cylindrical member having a pole body 84, a first end 86 positioned at one end of the pole body 84, and a second end 96 positioned on another side of the pole body 84 opposite the first end 86.

As shown, the first end 86 includes a first retention section 88 and a resting end section 94. The first retention section 88 includes threaded outer walls 90 and a display body receiving flange 92 positioned between the pole body 84 and the threaded outer walls 90. The resting end section 94 is a bulbous member extending from the first retention section 88.

As shown, the second end 96 includes a second retention section 98 and a rotation member receiving section 104. The second retention section 98 includes threaded outer walls 100 and a rotation member receiving flange 102 positioned between the pole body 84 and the threaded outer walls 100. The rotation member receiving section 104 is a cylindrical member extending from the second retention section 98 and has a diameter smaller than the pole body 84 and corresponding to the display rotation member 106.

With reference to FIG. 7, a display rotation member 106 according to the invention is shown. The display rotation member 106 is a planar member having a body 108, a pole retention member passageway 110 positioned at one end, and a flag fastener receiving passageway 112 positioned at opposite end thereof. The body 108 is flattened tag shape member having two planar surfaces 108*a*, 108*b* and pentagonal shaped in an exemplary embodiment thereof. However, one skilled in the art should appreciate that other designs are possible. The flag fastener receiving passageway 112 is a through hole extending through the planar surface s108*a*, 108*b*. The dimensions of the flag fastener receiving passageway 112 correspond with the rotation member receiving section 104 is by having a diameter slightly larger than a diameter of the rotation member receiving section 104.

Next with reference to FIGS. 6 and 7, the pole head 114 will be described. In an exemplary embodiment, the pole head 114 generally includes a head body 116 and a display pole receiving passageway 118. As shown, the head body 116 is a monolithic member having a rotation member receiving flange 102 positioned at one end thereof. The head body 116 can be formed from various abstract shapes and forms, or a three dimensional representative. For instance, the head body 116 can be formed to represent an animal, such as a tiger or an eagle, or display words, phrases, or slogans, such the acronym U.S.A. for the United States. The display pole receiving passageway 118 is a channel extending through the head body 116 and defined by body inner walls 116*a* that are threaded to mate with the second retention section 98 to secure the pole head 114 to the shaft 82.

Now with reference to FIGS. 1-7, assembly of a display system 1 according to the invention will be described. The retention section 10 is secured to the display section 40. The retention section 10 is secured to the known kingpin 206. The display body 42 is positioned such that the flange receiving opening 24 receives the lower flange 212. Then, the display body 42 is urged such that the shank 210 advances along the connector receiving passageway 28 and the lower flange 212 advances through the flange receiving section 26. The lower flange 212 is then stopped by the display body 42 and the retention device 32 is advanced through the retention device receiving passageway 30 by twisting of the handle 36 until the retention device 32 makes contact and secure the lower flange 212 in the flange receiving section 26.

Next, a plurality of display poles 80 are positioned in and secured to the display section 40 by twisting the shaft 82 and more particularly, the first retention section 88 into the plurality of pole receiving passageways 54. A flag is positioned over the shaft 82 and the display rotation member 106 is positioned on the rotation member receiving section 104 and secured when the pole head 114 is tighten to the second retention section 98. The flag is then secure to the rotation member receiving section 104 to control rotation of the flag about the shaft 82.

Now with reference to FIGS. 8-14, another display system 301 according to the invention will be described. The display system 301 is for use with a fifth wheel connector assembly 202 of a known recreational vehicle trailer 200. The display system 301 generally includes a locking section 310, an extender 390, a display section 40, and a plurality of display poles 80. For sake of brevity, only the locking section 310 and the extender 390 will be described, as the display section 40 and the plurality of display poles 80, as described above, will be used in assembly of the display system 301.

With reference to FIGS. 9-14, an exemplary embodiment of the locking section 310 will be described. For the embodiment of the present invention illustrated and being described, the locking section 310 generally includes a first locking body 312, a second locking body 340, a cantilever latch 370, and a hinge 386.

Figure 10:
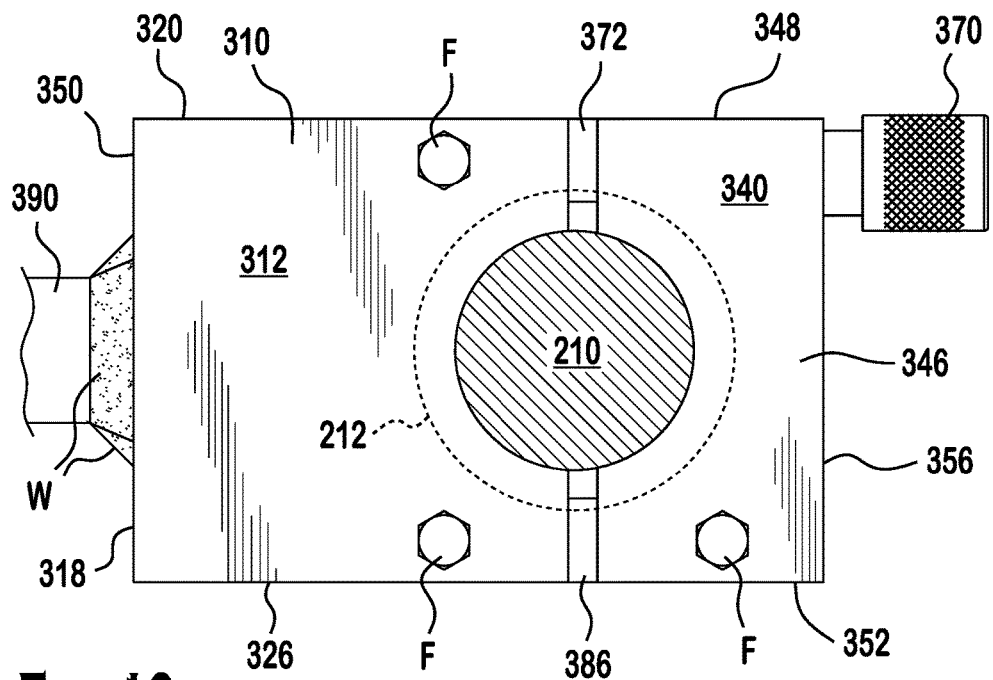
FIG. 10 is a close up top view of the display system of FIG. 9 taken along line 10-10.
Figure 11:
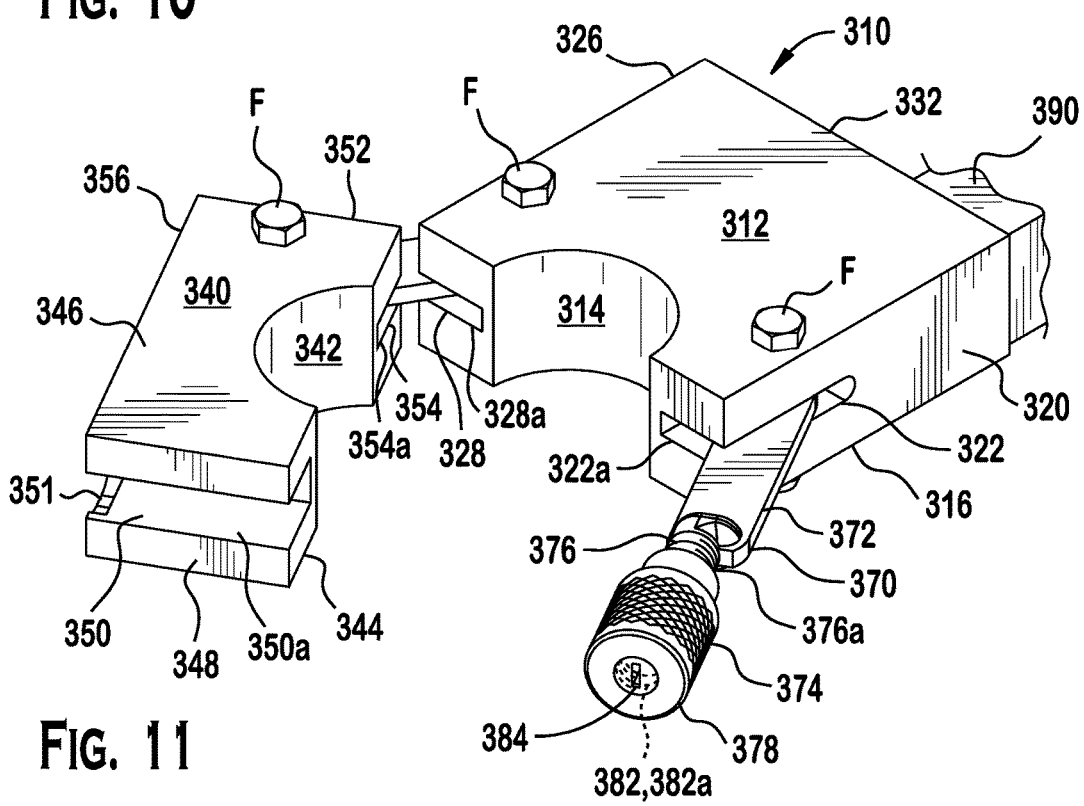
FIG. 11 is a perspective view of a retention section of the display system of FIG. 8.
Figure 12:
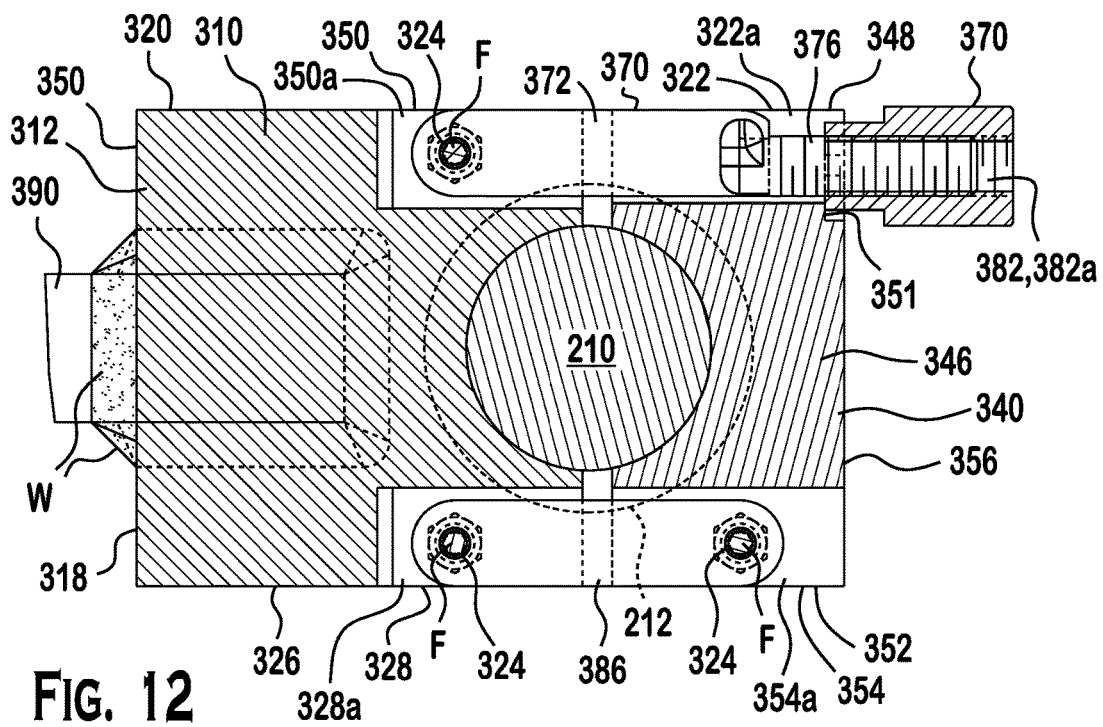
FIG. 12 is a sectional view of a retention section of the display system of FIG. 9 taken along line 12-12.
Figure 13:
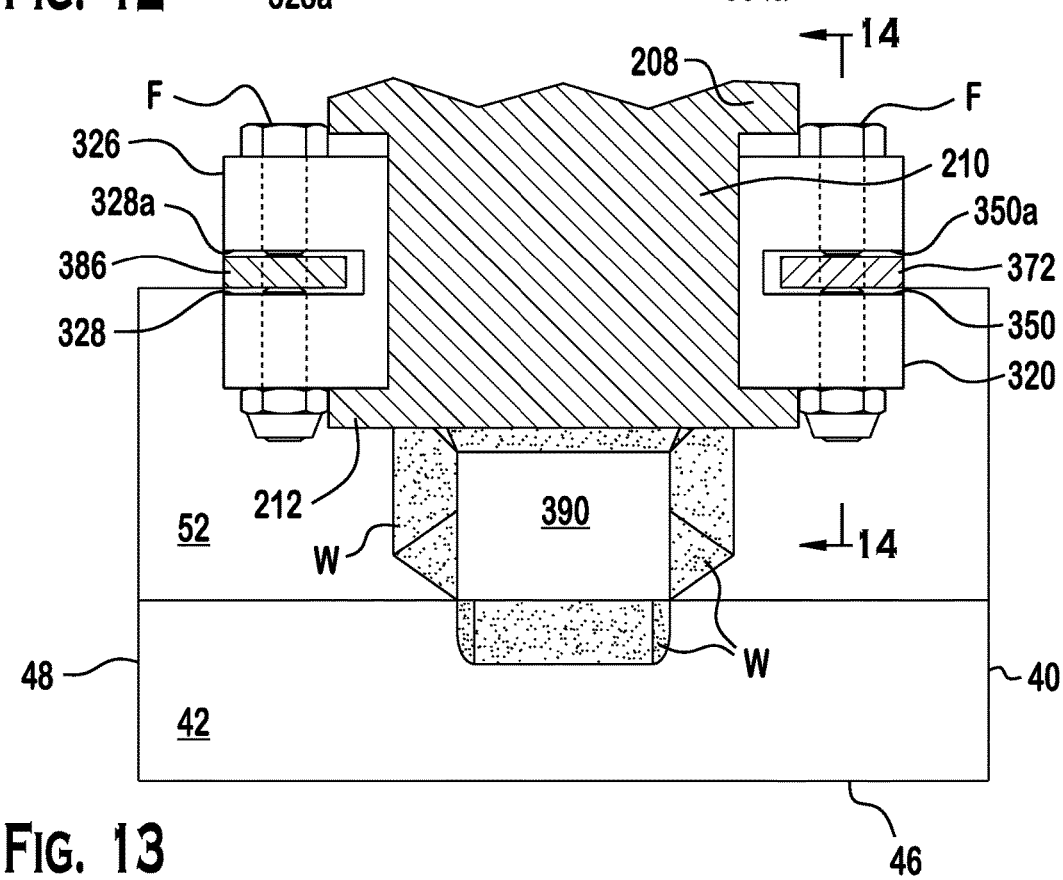
FIG. 13 is another sectional view of the retention section of the display system of FIG. 9 taken along line 13-13.
Figure 14:
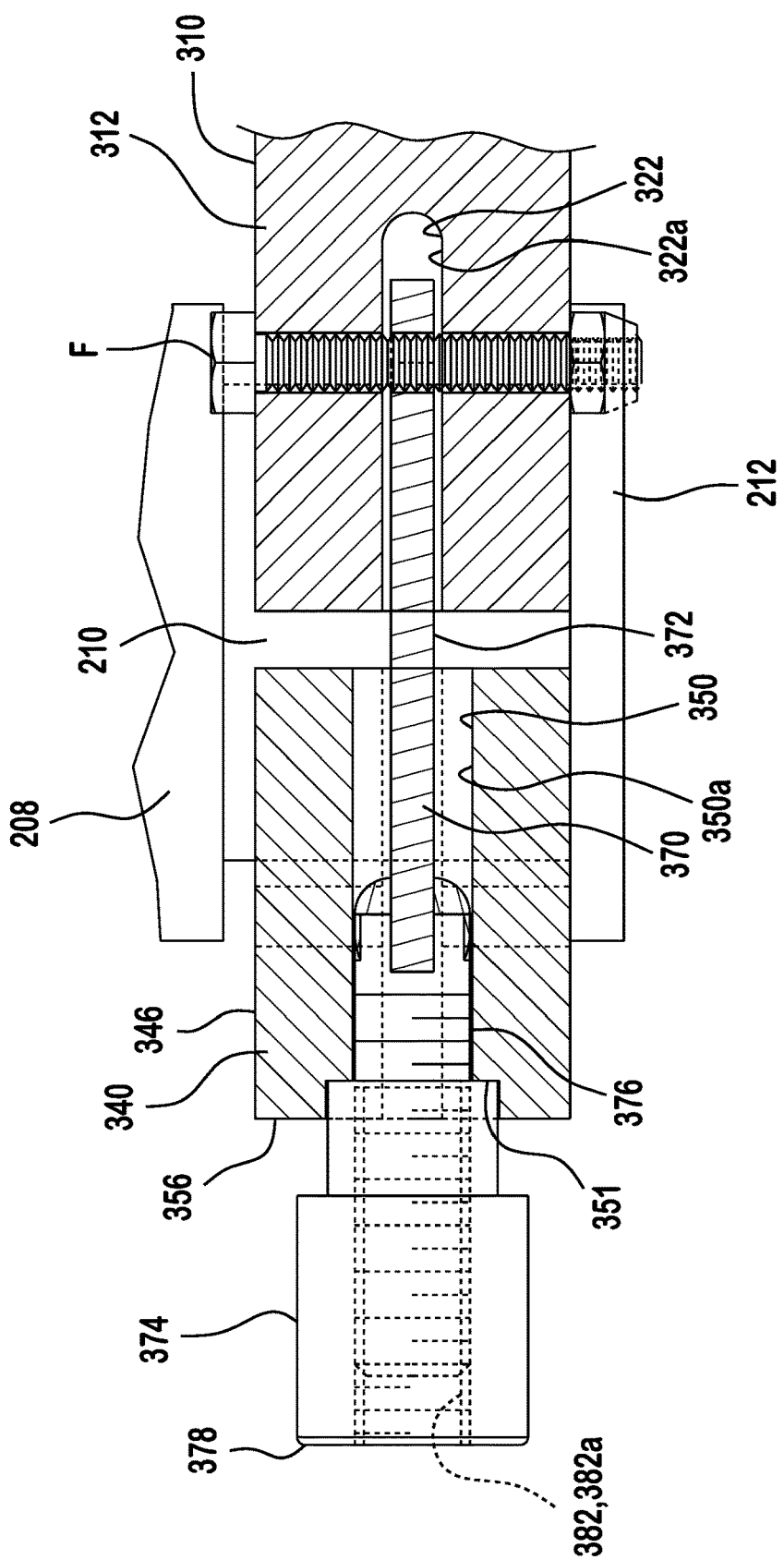
FIG. 14 is a sectional view of the retention section of FIG. 13 taken along line 14-14.

With reference to FIGS. 10 and 11, an exemplary embodiment of a first locking body 312 according to the invention is shown and will be described.

For the embodiment of the present invention illustrated and being described, the first locking body 312 is a solid planar member that is rectangular in shape. In an exemplary embodiment, the first locking body 312 is a monolithic structure prepared from a solid piece of metal. However, one skilled in the art should appreciate that the other shapes are possible, including square and cylindrical shape solids. Further, the first locking body 312 is made from aluminum, however, one skilled in the art should appreciate that the body could be made from other rigid materials, including other metals and rigid polymers or composites.

In an exemplary embodiment of the invention, the first locking body 312 generally includes a first shank receiving wall 314, a first lower flange receiving wall 316, a first collar receiving wall 318, a first latch receiving wall 320, and a first hinge receiving wall 326, and a front wall 332.

As shown in an exemplary embodiment of the invention, the first shank receiving wall 314 is located at one end of the first locking body 312, while the front wall 332 is positioned along opposite end thereof. The first latch receiving wall 320 and the first hinge receiving wall 326 are positioned along sides of the first locking body 312, between the first shank receiving wall 314 and the front wall 332. The front wall 332 is a planar surface wall facing the display section 40 and is secured to the extender 390. The first shank receiving wall 314 is a semi-circle shaped wall having a planar outer surface. In the shown embodiment, the first shank receiving wall 314 is shaped and sized to correspond with the shank 210. More particularly, the first shank receiving wall 314 is shaped and sized to receive half of the shank 210.

As shown in FIGS. 10 and 11, the first lower flange receiving wall 316 is a lower planar surface of the first locking body 312 and positioned on an under side thereof to bias the lower flange 212. The first collar receiving wall 318 is positioned opposite the first lower flange receiving wall 316 and is an upper planar surface of the first locking body 312. More particularly, the first collar receiving wall 318 is positioned on an upper side thereof and faces the collar 208.

Figure 9:
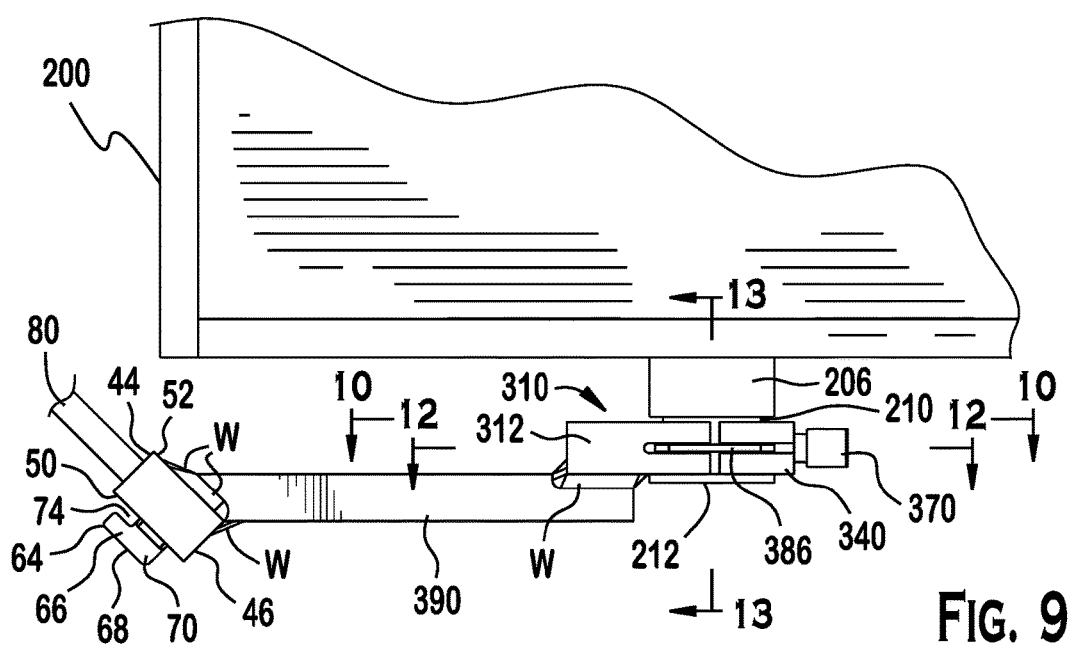
FIG. 9 is a side view of the display system of FIG. 8.

As shown in FIGS. 9, 10 and 11, the first latch receiving wall 320 is positioned on one side of the first locking body 312. The first latch receiving wall 320 is generally a planar surface and includes a first cantilever receiving section 322 extending along a portion thereof. In the shown embodiment, the first cantilever receiving section 322 is a groove extending lengthwise thereof and defined by first cantilever receiving walls 322*a*. The first cantilever receiving section 322 is sized to receive a portion of the cantilever latch 370. Further, the first latch receiving wall 320 includes a pivot fastener receiving passageway 324 extending vertically through the first locking body 312 and the first cantilever receiving section 322.

As shown in FIGS. 9, 10 and 11, the first hinge receiving wall 326 is provided and generally includes a first hinge receiving section 328. The first hinge receiving wall 326 is positioned on another side of the first locking body 312 and opposite the first latch receiving wall 320. The first hinge receiving wall 326 is generally a planar surface and the first hinge receiving section 328 extends along a portion thereof parallel to the first cantilever receiving section 322. The first hinge receiving section 328 is a groove extending lengthwise thereof and defined by first hinge receiving walls 328a. The first hinge receiving section 328 is sized to receive a portion of the hinge 386. Further, the first hinge receiving section 328 includes a pivot fastener receiving passageway 324 extending vertically through the first locking body 312 and the first hinge receiving section 328.

With reference to FIGS. 10 and 11, an exemplary embodiment of a second locking body 340 according to the invention is shown and will be described. For the embodiment of the present invention illustrated and being described, the second locking body 340 is a solid planar member that is rectangular in shape. In an exemplary embodiment, the second locking body 340 is a monolithic structure prepared from a solid piece of metal. However, one skilled in the art should appreciate that the other shapes are possible, including square and cylindrical shape solids. Further, the second locking body 340 is made from aluminum, however, one skilled in the art should appreciate that the body could be made from other rigid materials, including other metals and rigid polymers or composites.

In an exemplary embodiment of the invention, the second locking body 340 generally includes a second shank receiving wall 342, a second lower flange receiving wall 344, a second collar receiving wall 346, a second latch receiving wall 348, a second hinge receiving wall 352, and rear wall 356.

As shown in an exemplary embodiment of the invention, the second shank receiving wall 342 is located at one end of the second locking body 340, while the rear wall 356 is positioned along opposite end thereof. The second shank receiving wall 342 is positioned to face and correspond with the first locking body 312 and, more particularly, the first shank receiving wall 314.

The second latch receiving wall 348 and the second hinge receiving wall 352 are positioned opposite each other, along sides of the second locking body 340, between the second shank receiving wall 342 and the rear wall 356. The second shank receiving wall 342 is a semi-circle shaped wall having a planar outer surface. In the shown embodiment, the second shank receiving wall 342 is shaped and sized to correspond with the shank 210. More particularly, the second shank receiving wall 342 is shaped and sized to receive half of the shank 210.

As shown in FIGS. 10 and 11, the second lower flange receiving wall 344 is a lower planar surface of the second locking body 340 and positioned on an under side thereof to bias the lower flange 212. The second collar receiving wall 346 is positioned opposite the second lower flange receiving wall 344 and is an upper planar surface of the second locking body 340. More particularly, the second collar receiving wall 346 is positioned on an upper side thereof and faces the collar 208.

As shown in FIGS. 9, 10 and 11, the second latch receiving wall 348 is positioned on one side of the second locking body 340. The second latch receiving wall 348 is generally a planar surface and includes a second cantilever receiving section 350 extending along a portion thereof. In the shown embodiment, the second cantilever receiving section 350 is a groove extending lengthwise thereof and defined by second cantilever receiving walls 350a. The second cantilever receiving section 350 is sized to receive a portion of the cantilever latch 370. Further, the second latch receiving wall 348 further includes a lock receiving section 351 positioned at an end thereof. More particularly, the lock receiving section 351 extends outward from the second cantilever receiving section 350 and is sized and shaped to correspond with a locking section 374 of the cantilever latch 370. In the shown embodiment, the lock receiving section 351 is a cylindrical receiving space to receive and secure the cantilever latch 370 when rotated, and securing the first locking body 312 and the second locking body 340 together.

As shown in FIGS. 9, 10 and 11, the second hinge receiving wall 352 is provided and generally includes a second hinge receiving section 354. The second hinge receiving wall 352 is positioned on another side of the second locking body 340 and opposite the second latch receiving wall 348. The second hinge receiving wall 352 is generally a planar surface and the second hinge receiving section 354 extends along a portion thereof parallel to the second cantilever receiving section 350. The second hinge receiving section 354 is a groove extending lengthwise thereof and defined by second hinge receiving walls 354a. The second hinge receiving section 354 is sized to receive a portion of the hinge 386. Further, the second hinge receiving section 354 includes a pivot fastener receiving passageway 324 extending vertically through the second locking body 340 and the second hinge receiving section 354.

Now with reference to FIGS. 11-14, a cantilever latch 370 according to the invention will be described. In an exemplary embodiment of the invention, the cantilever latch 370 generally includes a rotation section 372 and a locking section 374. The rotation section 372 is an elongated planar member in the embodiment shown, and sized and shaped to correspond with the first latch receiving wall 320 and the second latch receiving wall 348. The rotation section 372 is made includes a pivot fastener receiving passageway 324 positioned at one end thereof. The locking section 374 extends outward from the rotation section 372 from an opposite side of where the pivot fastener receiving passageway 324 is positioned. In an exemplary embodiment, the locking section 374 generally includes a threaded shank section 376 and a catch 378. The threaded shank section 376 is an elongated cylindrical member having outer threads 376a positioned on an outer surface thereof. The catch 378 is a head like member having a threaded shank receiving space 382 extending through an end thereof and a lock 384 positioned on another end thereof to secure the catch 378 to the threaded shank section 376. The threaded shank receiving space 382 includes inner threads 382a that correspond to the outer threads 376a. As the catch 378 is rotated, the inner threads 382a engage the outer threads 376a. The catch 378 secures itself to the second locking body 340 and, more particularly, to the second latch receiving wall 348. The lock receiving section 351 is sized to receive a leading end of the catch 378. The trailing end of the cantilever latch 370 is rotatably secured to the first locking body 312 by a fastener positioned through the pivot fastener receiving passageways 324.

Now with reference to FIGS. 11-14, the hinge 386 will be described. In the shown embodiment, the hinge 386 is a planar member that is sized and shaped to correspond with the first hinge receiving section 328 and the second hinge receiving section 354. Both ends are rotatably secured to the first locking body 312 and the second locking body 340 by fasteners positioned through the pivot fastener receiving passageways 324.

Figure 8:
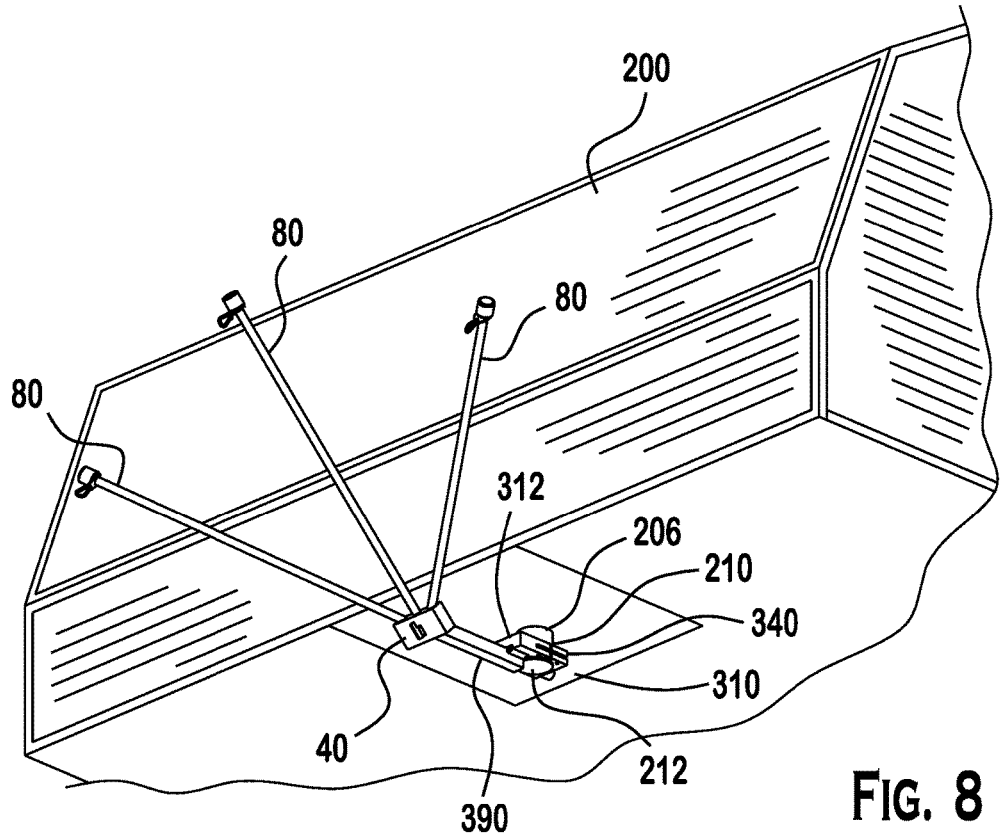
FIG. 8 is a perspective view of another display system according to the invention, shown connected to a known recreational vehicle trailer having a fifth wheel connector.

With reference to FIGS. 8 and 9, the extender 390 will be described. In an exemplary embodiment of the invention, the extender 390 is an elongated tubular member. However one skilled in the art should appreciate that the extension can be shaped in various ways and only provides distance between the locking section 310 and the display section 40.

Now with reference to FIGS. 8-14, assembly of a display system 301 according to the invention will be described. The locking section 310 is secured to the display section 40 through the extender 390. The locking section 310 is secured to the known kingpin 206. This is performed by rotating the first locking body 312 and the second locking body 340 about the shank 210 and, more particularly, the first shank receiving wall 314 and the second shank receiving wall 342 about the shank 210. As the catch 378 is rotated, the inner threads 382a engage the outer threads 376a. The catch 378 secures itself to the second locking body 340 and, more particularly, to the second latch receiving wall 348. The lock receiving section 351 is sized to receive a leading end of the catch 378. The trailing end of the cantilever latch 370 is rotatably secured to the first locking body 312 by a fastener positioned through the pivot fastener receiving passageways 324.

The display body 42 is positioned such that the flange receiving opening 24 receives the lower flange 212. Then, the display body 42 is urged such that the shank 210 advances along the connector receiving passageway 28 and the lower flange 212 advances through the flange receiving section 26. The lower flange 212 is then stopped by the display body 42 and the retention device 32 is advanced through the retention device receiving passageway 30 by twisting of the handle 36 until the retention device 32 makes contact and secure the lower flange 212 in the flange receiving section 26.

Next, a plurality of display poles 80 are positioned in and secured to the display section 40 by twisting the shaft 82 and more particularly, the first retention section 88 into the plurality of pole receiving passageways 54. A flag is positioned over the shaft 82 and the display rotation member 106 is positioned on the rotation member receiving section 104 and secured when the pole head 114 is tighten to the second retention section 98. The flag is then secure to the rotation member receiving section 104 to control rotation of the flag about the shaft 82.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A display system for a recreational vehicle connector comprising:
   a retention section having a retention body, a flange receiving opening extending through the retention body and into a flange receiving section, and a shank receiving passageway positioned above and extending transverse into the flange receiving section, the retention body is a rectangular shaped monolithic structure defined by a top wall spaced from a bottom wall and body sidewalls extending between the top wall and the bottom wall;
   a display section having a display body connected to the retention system and a plurality of pole receiving passageways extending there though; and
   a plurality of display poles positioned in the plurality of pole receiving passageways.

2. The display system of claim 1, wherein the retention body includes a connection wall extending between a rear wall and the bottom wall of the retention body.

3. The display system of claim 2, wherein the connection wall is connected to the display section such that the display section is angled with respect to the retention body.

4. The display system of claim 1, wherein the flange receiving opening is positioned between the top wall and the bottom wall and shaped and size to correspond to a lower flange a kingpin.

5. The display system of claim 4, wherein the flange receiving section is a slot extending from flange receiving opening through the retention body and toward the rear wall.

6. The display system of claim 5, wherein the shank receiving passageway is an elongated opening positioned along the top wall and extending backward from the front wall to the rear wall.

7. The display system of claim 6, wherein the shank receiving passageway corresponds with the flange receiving opening along the flange receiving section.

8. The display system of claim 7, further comprising a retention device receiving passageway extending through the bottom wall to the flange receiving section.

9. The display system of claim 8, wherein the shank receiving passageway is a cylindrical channel that is angled with respect to the bottom wall and the flange receiving section and includes threaded inner sidewalls.

10. The display system of claim 9, further comprising a retention device having a threaded shaft section and a handle.

11. The display system of claim 10, wherein the display body is a rectangular monolithic structure defined by a top wall spaced from a bottom wall and side walls extending between the top wall and the bottom wall.

12. The display system of claim 1, wherein each of the plurality of pole receiving passageways is a cylindrical channel extending from the top wall to the bottom wall and includes inner sidewalls.

13. The display system of claim 12, wherein the plurality of pole receiving passageways are positioned such that one pole receiving passageway is aligned with a vertical axis of the display body and a pair of pole receiving passageways are angled with respect to the vertical axis of the display body.

14. The display system of claim 13, wherein each pole receiving passageway of the plurality of pole receiving passageways includes a pole receiving section, a pole retention section and a head receiving section.

15. The display system of claim 1, wherein each display pole of the plurality of display poles includes a shaft, a display rotation member, and a pole head.

16. The display system of claim 15, wherein each display pole of the plurality of display poles includes a first retention section and a resting end section.

17. The display system of claim 16, wherein the first retention section includes threaded outer walls and a display body receiving flange positioned between a pole body and the threaded outer walls.

18. The display system of claim 17, wherein the resting end section is a bulbous member extending from the first retention section.

19. A display system for a recreational vehicle connector comprising:
   a retention section having a retention body, a flange receiving opening extending through the retention body and into a flange receiving section, and a shank receiving passageway positioned above and extending transverse into the flange receiving section;

a display section having a display body connected to the retention system and a plurality of pole receiving passageways extending there though, each of the plurality of pole receiving passageways is a cylindrical channel extending from the top wall to the bottom wall and includes inner sidewalls; and a plurality of display poles positioned in the plurality of pole receiving passageways.

20. The display system of claim 19, wherein the plurality of pole receiving passageways are positioned such that one pole receiving passageway is aligned with a vertical axis of the display body and a pair of pole receiving passageways are angled with respect to the vertical axis of the display body.

21. The display system of claim 20, wherein each pole receiving passageway of the plurality of pole receiving passageways includes a pole receiving section, a pole retention section and a head receiving section.

22. A display system for a recreational vehicle connector comprising:

a retention section having a retention body, a flange receiving opening extending through the retention body and into a flange receiving section, and a shank receiving passageway positioned above and extending transverse into the flange receiving section;

a display section having a display body connected to the retention system and a plurality of pole receiving passageways extending there though; and a plurality of display poles positioned in the plurality of pole receiving passageways, each display pole of the plurality of display poles includes a shaft, a display rotation member, and a pole head.

23. The display system of claim 22, wherein each display pole of the plurality of display poles includes a first retention section and a resting end section.

24. The display system of claim 23, wherein the first retention section includes threaded outer walls and a display body receiving flange positioned between a pole body and the threaded outer walls.

25. The display system of claim 24, wherein the resting end section is a bulbous member extending from the first retention section.

* * * * *